United States Patent Office 2,768,971
Patented Oct. 30, 1956

2,768,971

PREPARATION OF ALKYL-ARYL-UREAS

Richard Lewis Jones, Blackley, England, assignor to Imperial Chemical Industries Limited, London, England, a corporation of Great Britain No Drawing. Application May 16, 1955, Serial No. 508,789

Claims priority, application Great Britain May 26, 1954

7 Claims. (Cl. 260—553)

This invention relates to the manufacture of organic compounds. In particular it relates to an improved process for the manufacture of 1-aryl-3-monoalkyl and 1-aryl-3:3-dialkyl ureas, having herbicidal properties.

It is known to make these compounds by reacting a primary or secondary amine with an isocyanate or a carbamyl chloride.

According to the present invention, there is provided an improved process for the manufacture of organic compounds of the formula:

Ar.NHCONR'R'' wherein Ar stands for an aromatic radical which may optionally be substituted, wherein R' stands for an alkyl radical and wherein R'' stands for hydrogen or for an alkyl radical, which comprises heating the corresponding primary aromatic amine of the formula ArNH$_2$ wherein Ar has the meaning stated above, with an equimolecular proportion of urea and an equimolecular proportion or, conveniently, an excess of an alcohol or a phenol, having a boiling point between 100° C. and 200° C., and when evolution of ammonia has ceased, passing into the hot molten product the corresponding mono- or di-alkylamine of the formula HN.R'R'', wherein R' and R'' have the meaning stated above, and continuing the introduction of the mono- or di-alkylamine until any excess of the alcohol or phenol, if present, and also that which is formed during this stage of the reaction has been removed by distillation.

As suitable primary aromatic amines of the formula ArNH$_2$ wherein Ar has the meaning stated above, there may be mentioned for example aniline and halogenated anilines for example p-chloroaniline and 3:4-dichloroaniline.

As suitable mono- or di-alkylamines of the formula HN.R'R'' wherein R' and R'' have the meaning stated above, there may be mentioned for example mono- and di-methylamine and mono- and di-ethylamine.

As suitable alcohols or phenols there may be mentioned for example, cyclohexanol, n-hexanol, phenol.

The alcohol or phenol removed by distillation and any excess of the mono- or di-alkylamine which may pass unreacted through the molten contents of the vessel may be recovered and reused in subsequent preparations. Alternatively, the mono- or di-alkylamine so recovered may be recycled directly during the process.

The product so obtained is molten 1-aryl-3-monoalkyl or 1-aryl-3:3-dialkyl urea suitable for technical use.

As obtained molten at the end of the described process, the product can either be allowed to solidify and be separately pulverized or it can be converted into flakes or granules by known means.

The invention is illustrated but not limited by the following examples in which the parts are by weight:

Example 1

In a vessel provided with a stirrer, reflux condenser and a thermometer to show the temperature of the liquid contents of the vessel, 93 parts of aniline, 150 parts of cyclohexanol and 60 parts of urea are mixed and heated.

Ammonia begins to come off at about 130° C. and is evolved continuously as the internal temperature is raised, during 5 hours, to 210° C. The temperature is kept at 210° C. until no more ammonia is evolved. This takes about one more hour. The reflux condenser is now removed and an ordinary condenser put in its place, together with an inlet tube for passing in dimethylamine. With the liquid in the vessel at 200° C., anhydrous dimethylamine is passed in at a rate of 62.5 parts per hour. Cyclohexanol containing unreacted dimethylamine distils off and is collected in a receiver and the cyclohexane and dimethylamine separated in any suitable way. When distillation of cyclohexanol comes to an end the introduction of dimethylamine is stopped and the contents of the reaction vessel are poured out. The product so obtained (150 parts) has a setting point of 115–120° C. and is sufficiently pure for technical purposes. It can be ground to a powder which may be used directly for incorporation in herbicidal compositions.

If it is desired to have a purer product the ground crude material is stirred with 300 parts of 25% aqueous hydrochloric acid, the suspension filtered, and the residue washed with a further 150 parts of 25% aqueous hydrochloric acid in 2 equal portions. The combined acid filtrates are diluted with 1,200 of water, the precipitated solid filtered off, washed with water and dried to give 1-phenyl-3:3-dimethylurea M. P. 128° C.

Example 2

127.5 parts of p-chloroaniline, 60 parts of urea and 150 parts of cyclohexanol are mixed in the apparatus used as described in Example 1, and heated eventually to 210° C. during five hours until no more ammonia is evolved. Anhydrous dimethylamine is passed through the molten mass at 20° C. as described in Example 1 until no more cyclohexanol distils off. The product (188 parts) has a setting point of 160–170° C. and is sufficiently pure for technical purposes. The cooled mass may be ground and used directly for incorporation in herbicidal compositions. If a pure product is desired the ground mass may be extracted with 32% aqueous hydrochloric acid and the extract subsequently diluted with water as described in Example 1 to give 1-(p-chlorophenyl)-3:3-dimethyl urea, M. P. 165° C.

Example 3

47 parts of aniline, 71 parts of phenol and 30 parts of urea are mixed and heated in the apparatus as described in Example 1, but up to 200° C. After 5 hours ammonia is no longer evolved. Dimethylamine is then passed (as described in Example 1) into the molten product at 200° C. Phenol and excess of dimethylamine distils off. Crude 1-phenyl-3:3-dimethyl urea (70 parts) so obtained, is suitable for use as described in Example 1.

Example 4

75 parts of n-hexanol, 47 parts of aniline and 30 parts of urea are mixed and heated in the apparatus as described in Example 1, such that the temperature reaches 208° C. after 8 hours and ammonia is then no longer evolved. Dimethylamine is then passed (as described in Example 1) into the molten mass at 200° C. The n-hexanol and excess dimethylamine distils off. The crude product so obtained (76 parts) has a setting point of 113–117° C. and is suitable for use as described in Example 1.

Example 5

81 parts of 3:4-dichloroaniline, 30 parts of urea, and 75 parts of cyclohexanol are mixed and heated in the apparatus as described in Example 1 whereby the temperature reaches 210° C. after 5 hours and ammonia is then no longer evolved. Dimethylamine is then passed (as described in Example 1) into the molten mass at 200° C. The cyclohexanol and excess dimethylamine distils off. Crude 1-(3:4-dichlorophenyl)-3:3-dimethyl urea so obtained (114 parts) has a setting point of 120–130° C. and is sufficiently pure for technical purposes. The cooled mass may be ground and used directly for incorporation in herbicidal compositions.

What I claim is:

1. Process for the manufacture of organic compounds of the formula:

Ar.NHCONR'R'' wherein Ar stands for a radical selected from the group consisting of phenyl, monochlorophenyl and dichlorophenyl, R' stands for a short chain alkyl radical and R'' stands for a member of the group consisting of hydrogen and short chain alkyl radicals, which comprises heating under reflux the corresponding primary aromatic amine of the formula ArNH$_2$ wherein Ar has the meaning stated above, with an equimolecular proportion of urea and at least an equimolecular proportion of an inert solvent selected from the group consisting of monohydric saturated alcohols and monohydric phenols having a boiling point between 100° C. and 200° C., and when evolution of ammonia has ceased, passing into the resulting hot molten product, while heating, an alkylamine of the formula HN.R'R'', wherein R' and R'' have the meaning stated above, and continuing said heating and introduction of said alkylamine until said solvent has been removed by distillation.

2. Process as claimed in claim 1 wherein the hydroxy compound is cyclohexanol.

3. Process as claimed in claim 1 wherein the hydroxy compound is n-hexanol.

4. Process as claimed in claim 1 wherein the hydroxy compound is phenol.

5. Process as caimed in claim 1 wherein the primary aromatic amine is p-chloroaniline.

6. Process as claimed in claim 1 wherein the primary aromatic amine is 3,4-dichloroaniline.

7. Process as claimed in claim 1 wherein the alkylamine is dimethylamine.

References Cited in the file of this patent
UNITED STATES PATENTS 2,673,877    Thompson _____ Mar. 20, 1954